United States Patent Office 3,469,688
Patented Sept. 30, 1969

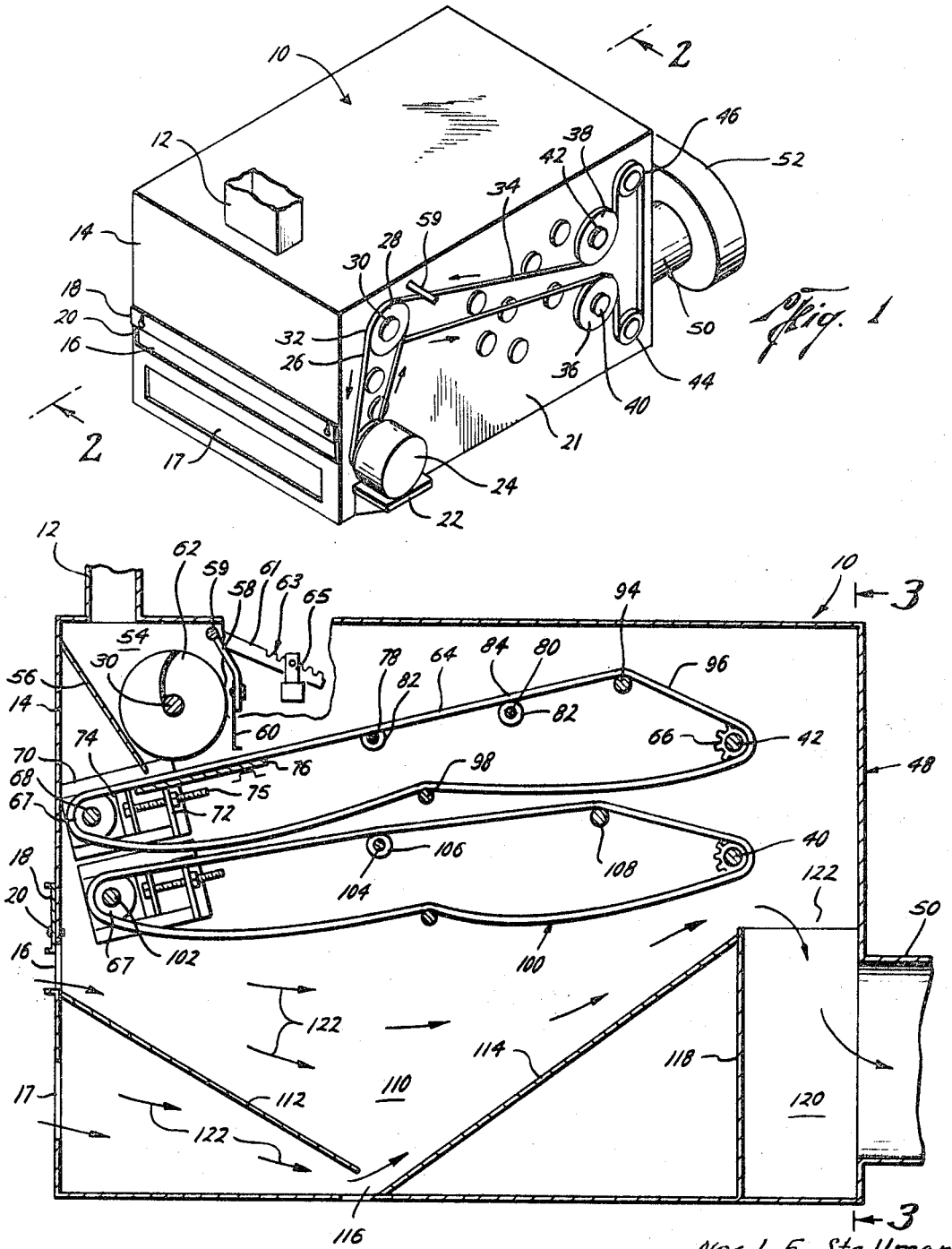

3,469,688
GRAIN SCALPER
Neal E. Stallman, Garwood, Tex., assignor to P and S Grain Equipment, Inc., Cuero, Tex., a corporation of Texas
Filed Dec. 19, 1966, Ser. No. 602,682
Int. Cl. B07b 1/10, 1/00
U.S. Cl. 209—10       8 Claims

ABSTRACT OF THE DISCLOSURE

An improved apparatus for the separation of grain from the foreign matter such as chaff straw and the like, that becomes intermixed with the grain as the grain is harvested. It utilizes a controlled feed, vibrating belts and air streams to bring about this separation, as well as improved features in various elements making up the device.

---

Figure 3:
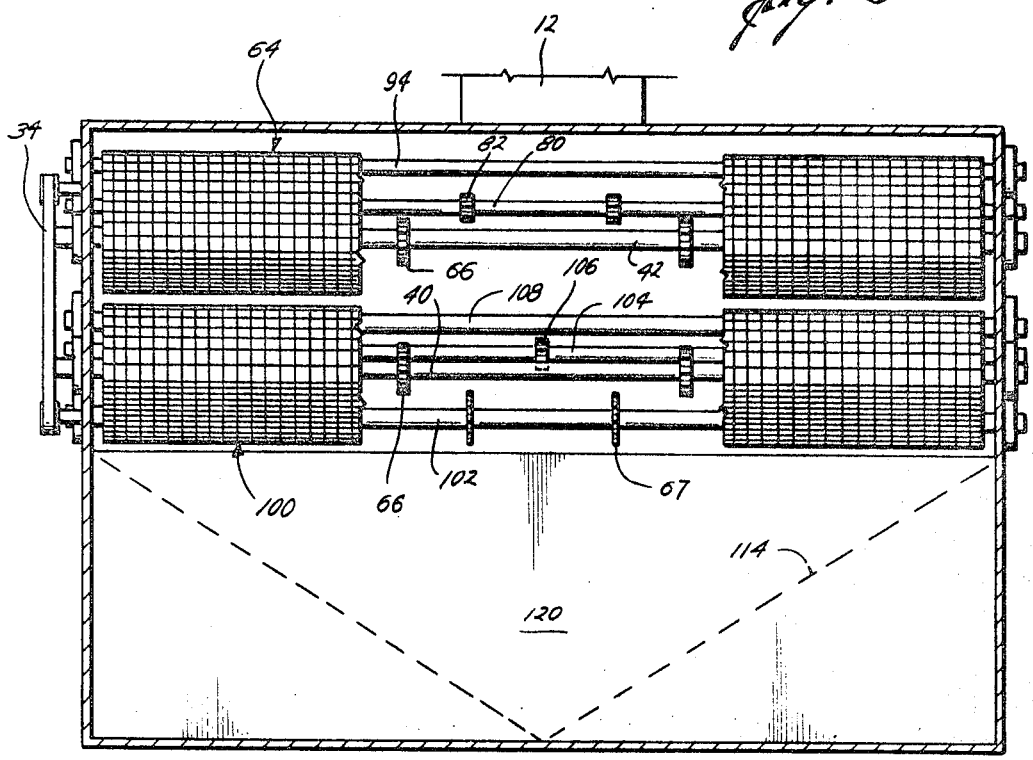

The present invention relates to grain cleaning equipment, and more specifically to apparatus for separating grain from foreign matter which is gathered with the grain as the grain is harvested.

In the harvesting of grain, a reoccuring problem is that of the removal of foreign matter from the grain. Due to the nature of grain and to the manner in which grain is harvested, substantial quantities of foreign matter are taken in as the grain is collected in the fields. As the mechanical harvesters become larger and the volume of grain to be processed becomes greater, the problem of the separation of the grain from such foreign matter increases. Such separation is relatively difficult due to the fact that the grain is of a rather small size and becomes thoroughly comingled and intertwined with foreign matter such as sticks, straw, vines, etc. Providing good separation of the grain from such foreign objects, without a significant loss of grain by being disposed of with the foreign objects, has been a difficult problem to master because of the extremely large volume of harvest machines and limited floor space in grain elevators for processing the grain gathered by the harvest machines.

The present invention seeks to provide apparatus which perform such a separating function in a highly satisfactory manner by utilizing a moving endless belt comprised of a chain mesh as its primary means of separating grain from foreign matter. The mesh is made up of links which have openings therebetween. The openings are of a size large enough to allow the grain to pass through but are sufficiently small to prevent larger objects such as stones, vines, sticks, straw, etc., from passing therethrough. The belt also passes over a plate which is placed opposite the means feeding the belt to prevent narrow foreign objects from passing through the opening end first, as will be explained more fully below.

A method of feeding the mixture of grain and foreign matter into the belt is employed which feeds the mixture in a regulated manner, whereby the layer of the mixture moving onto the belt is of a predetermined depth or thickness. By limiting the layer thickness, all of the grain has an opportunity to fall through the openings before reaching the end of the travel of the belt. This also prevents clogging of the openings as a result of too much grain being forced into them.

In addition, a more complete separation is provided by the utilization of novel means to vibrate, rock and shake the belt as it moves, whereby the mixture of grain and foreign matter is redistributed on the belt to insure an opportunity for all of the grain to pass through the openings. The belt also moves along an inclined path for a portion of its travel to allow large objects such as stones, intertwined straw, etc., to roll or turn, whereby any grain caught thereon will be spilled onto the belt for separation.

As the grain falls from the belt and into a collecting or receiving means, air is passed through the falling grain to carry away light foreign objects such as chaff and dust. Thus the present invention provides method and apparatus for separation of foreign matter of varying size and weight.

It is, therefore, an object of the present invention to provide a simple and inexpensive device for the separation of grain from foreign matter which is collected with the grain.

A further object is to provide an apparatus which is an effective, efficient and reliable means for such separation.

Another object is to provide relatively small separation apparatus which will handle large volumes of grain.

A still further object of the present invention is to utilize an endless belt having openings therein through which grain will fall but foreign matter will be prevented from falling due to the respective sizes of the openings and of the foreign matter.

An additional object of the present invention is to provide means associated with the endless belt to redistribute the mixture of the grain and foreign matter on the belt to insure a greater degree of separation.

Another object is to utilize a chain mesh endless belt having rollers over which the belt passes to shake and vibrate the belt and an incline in said belt to insure that all of the grain comes into contact with the belt surface thus providing opportunity for it to pass through the openings.

Figure 4:
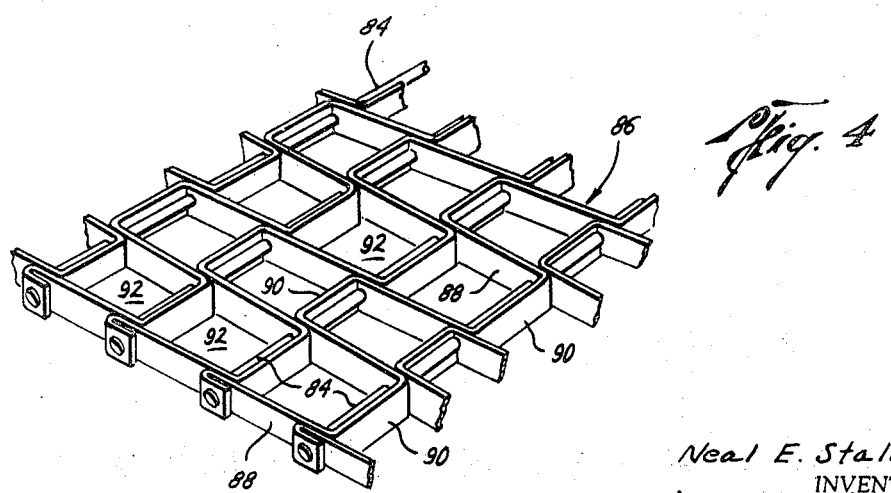

Other and further objects, features and advantages will be apparent from the following description of a presently preferred embodiment of the invention, given for the purpose of disclosure, taken in conjunction with the accompanying drawings wherein like character references designate like parts throughout the several views and where:

FIGURE 1 is a perspective view of a preferred embodiment of the present invention showing the driving means, FIGURE 2 is a side view of the apparatus shown in FIGURE 1 and taken along section lines 2—2 of FIGURE 1, FIGURE 3 is an end view of the apparatus shown in FIGURE 1, a portion thereof being broken away for purposes of illustration, and FIGURE 4 is a section of the chain mesh which makes up the endless belt.

Referring now to FIGURE 1, an exterior perspective view of a preferred embodiment of the present invention is shown, this view disclosing the means used to drive the apparatus. The embodiment shown consists of a housing 10 having an inlet feeding duct 12 located in the top thereof. The housing 10 is composed of a top, two side walls and a front and back wall, 14 and 48 respectively. The front wall 14 has located therein openings 16 and 17 for the admission of air, the purpose of which will be explained below. A door 18 is slidably mounted on the front wall 14 by any suitable means, such as bolt and slot means 20. By slidably mounting the door 18, the amount of air taken in through the opening 16 can be controlled. Although no sliding door is shown for opening 17, it is, of course, understood that an arrangement similar to door 18 may be utilized.

Located on the near side wall 21, as viewed in FIGURE 1, is a platform 22 upon which a motor 24 is mounted. A belt 26 is driven by said motor in the direction of the arrows shown and is operatively connected to the sheave or pulley 28 which is fixedly mounted on the shaft 30. Also mounted on the shaft 30 is a second sheave 32 which is almost completely hidden by sheave 28. The sheave 32 is also fixedly attached to the shaft 30 and accordingly, rotates with the shaft 30. A second belt 34 is driven by the sheave 32 in the direction of the arrows shown. The belt 34 engages the sprocket type members 36 and 38 which are mounted on shaft 40 and 42, respectively. The members 36 and 38 are driven by the belt 34 which also passes around idler members 44 and 46 which are rotatably mounted on the near sidewall 21 of the housing.

Extending from the rear wall 48 of the housing is an exhaust duct 50. Attached to the outermost end of duct 50 is an air suction fan 52.

Referring now to FIGURE 2 of the drawing, a side section view of the preferred embodiment of the present invention is shown. The inlet feeding duct 12 opens into a hopper 54 which is composed of the inclined wall 56 and the swinging gate 58 and the two sidewalls of the housing 10. Extending below and slidably mounted on swinging gate 50 is a gate 60, which is used to control the flow of the mixture of grain and foreign matter which is allowed to feed onto the belt. Also in the hopper 54 is an auger 62 which is securely fastened onto the shaft 30 for rotating motion therewith.

Gate 58 swings on shaft 59 which extends through, and is rotatable in, the sidewalls of housing 10. An arm 61 is fastened to one end of shaft 59 on the outside of housing 10 as seen in the cutout portion of the housing shown in FIGURE 2. Another similar arm is attached to the opposite end of shaft 59 but is not shown in FIGURE 1 to allow the exterior of the housing 10 to be more clearly shown. Arms 61 have notches 63 cut in their upper edges. Weights 65 are suspended from the notches 63 to maintain pressure on gate 58. The notches 63 and the arm 61 allow the weights 65 to be moved closer to the shaft 59 to decrease the pressure on gate 58, or further away from the shaft to increase the pressure on gate 58.

Located below the hopper 54 is an endless belt 64. The belt 64 is in continuous motion, being driven by the toothed members 66 which are fixedly attached to the driven shaft 42. As was seen in the discussion of FIGURE 1, the shaft 42 is driven by the belt 34 through the member 38. The opposite end of belt 64 passes about the rotating idler shaft 68 and connected idler pulleys 67.

Thus, top and bottom runs of the belt are defined, which runs extend between the shafts 42 and 68.

The shaft 68 is adjustably mounted in order that the proper degree of slack, which is necessary for proper operation as will be explained, may be maintained in the endless belt 64. For this adjustable mounting, the present embodiment utilizes channel members mounted on the side walls of the housing 10 only one of which is shown in FIGURE 2, and is indicated by the numeral 70. The channel member 70 is so mounted that its parallel flanges extend outwardly from the side wall of the housing. An end plate 72 is attached at one end of the channel member 70. Shaft 68 is fastened to a member 74 which is slidably mounted between the parallel flanges of the channel member 70. Member 74 is connected to plate 72 by means of bolt 75, the bolt 75 being in threaded engagement with the end plate 72. As one can see, by rotating bolt 75, the threaded engagement with the end plate 72 will cause the sliding member 74, and in turn the rotating shaft 68, to slide within the parallel flanges of the channel member 70, thus giving a degree of control over the tautness of the belt 64.

A plate 76 is located below the auger 62 but on the opposite side of the belt as is shown in FIGURE 2. The purpose of plate 76 is to prevent narrow objects such as sticks from passing through the belt should they be fed from the hopper end first.

Turning now to FIGURE 4, a chain mesh that is used to make up the belt 64 is shown in greater detail. It is composed of a plurality of horizontal rods 84 disposed and extending in a direction transverse to the movement of the belt. These rods 84 connect a series of shaped metal links which form the belt. These links are composed of essentially parallel portions 88 which are connected at their ends by portions 90 in an alternating manner as seen in FIGURE 4. Each pair of members 88 and their connecting members 90 form an essentially U-shaped figure. Each individual link, accordingly, resembles a series of U-shaped members fastened together in side-by-side relationship, with alternate U-shaped members being inverted. The mouth or open end of the formed U is slightly wider than is the connecting member 90, whereby the closed end of each U-shaped segment may be placed in the open end of another U-shaped member. Members 88 have holes at both of their ends so that the rods 64 can pass therethrough when the elements are lined up in interlocking manner as is shown in FIGURE 4, thus forming the openings 92. The openings in the members 88 are large enough to allow the links to rotate about the rods 84.

The endless belt 64 travels in an upwardly inclined path for most of its length between the shafts 42 and 68. During this upwardly inclined path of travel, the belt passes over shaft members 78 and 80. These shaft members have attached thereto individual rollers 82 which are of a larger diameter than are the shafts upon which they are mounted. These may also be seen in FIGURE 3.

The members 82 have a width of such a size that the open spaces 92 formed in the chain mesh are of larger size. Accordingly, when a joint between two links of the chain mesh belt 64, which joint is made up of the axially extending members 90 and rods 84, pass over the rollers 82, they will ride up on the rollers 82. As the belt continues however, and the openings 92 approach the rollers 82, the rollers will move up into the openings, causing the chain mesh belt 64 to drop down. This down position is shown on the shaft member 78. The position of the belt as a joint passes over a roller 82 is shown in conjunction with the shaft 80. Thus, as the belt moves, the alternating action of the rollers 82 against the joints and the openings in the belt, cause the belt to ride up and then, because of the size of the rollers relative to the openings in the belt, to suddenly drop down resulting in a shaking or jarring effect on the belt. The size of rollers may be change to vary the jarring action. Fine adjusting means (not shown) are located on both shaft 78 and 80 to vary the distance between them. Such is necessary to properly adjust the jarring action of rollers 82 or else the portion of belt 64 passing between these shafts will simply stand still with no up and down movement.

At the end of its upwardly inclined travel, the belt 64 passes over the rotatable shaft 94 and then travels in a downwardly inclined path as indicated by the segment 94 of the belt. Shaft 94 is of sufficiently large diameter to give sturdy support to the belt 64, but is small enough that links of belt 64 will have a breaking action as the belt passes over the shaft 94. This breaking action occurs as the center of each link passes over the shaft and gives added vibrating effect to the belt, as well as causing the large objects to roll as will be discussed. The belt then passes over the shaft 42 with its sprocket members 66 and returns to the rotating shaft 68. A rotating idler shaft 98 is located along the return path of the belt to the shaft 68 to prevent the belt 64 from possibly coming into contact with the lower belt 100.

The lower belt 100, which is made up of the same chain mesh as is belt 64, is driven by the shaft 40 with its sprocket members, the guide pulley 36 and the belt 34 in the same manner as is belt 64. Supporting the opposite end of the endless belt 100 is a rotatable shaft 102 and idler disks 67, the shaft 102 being adjustably mounted in the same manner as is the rotatable shaft 68. An examination of FIGURE 3 discloses the relative thinness of idlers 67 as compared to sprockets 66. One or more rotating shafts 104 are used to shake or vibrate the belt 100, said shaft 104 having rollers 106 to act with the joints and openings in the belt 100 as do rollers 82 with belt 64. A roller 108 is located at the uppermost part of the path of the belt 100, and from that point, the belt 100 travels in a downwardly inclined path to the driving shaft 40. The roller 108 induces the breaking action in belt 100 as did shaft 94 in belt 64.

Located beneath the belts 64 and 100 is a hopper 110 which is defined by the sidewalls of the housing 10 and by the inclined walls 112 and 114. An opening 116 is located at the bottom of the hopper, whereby the grain falling into the hopper is fed onto conveyor means (not shown) for further processing. An upstanding wall 118 is shown beneath the driving shafts 42 and 40 and, with the side walls of the housing 10, define a hopper 120 for objects falling off of the ends of the belts 64 and 100.

Air is sucked into the housing 10 through the openings 16 and 17 by means of the air suction fan 52 shown in FIGURE 1. The path of travel of the air is shown in FIGURE 2 and is indicated by the arrows 122. The air travels generally through the hopper 110 or through opening 116, over the junction of the walls 114 and 118 and then into the exhaust duct 50.

Turning now to FIGURE 3, there is shown an end view of the apparatus with a portion of the wall 48 broken away. The two belts 64 and 100 are also broken away to more clearly show some of the rotating shafts, pulleys and sprockets, used to move the belts. The relative thicknesses of the idler pulleys 67 and the sprockets 66 are illustrated. The broken line 124 is the bottom of hopper 120.

Turning now to the operation of the device, the mixture of grain and foreign matter that has been harvested from the fields is introduced into the housing 10 through the duct 12. The mixture collects in the hopper 54 and is fed in a controlled or regulated manner by the auger 62, onto the belt 64. The gate 60 evens out the layer of the mixture that is deposited on the belt 64 and thereby prevents the layer from becoming too thick. The weights 65 exert a predetermined amount of pressure on the gate causing it to stay in the position shown in FIGURE 2 under normal conditions. As the volume of grain coming through inlet 12 increases, the pressure of the grain on the gate 60 increases, causing it to swing upwardly. This swinging action of the gate compensates for any normal variations in feed as well as allows large objects to pass, should they be fed into the machine. The weights 65 may, of course, be shifted in the notches 63 to vary the resistance of the gate to the grain. In this manner, the grain will be fed evenly onto the full width of the belt regardless of the volume of grain being processed.

In this embodiment, the gate is so constructed and positioned that when it is in its position closest to the auger 62 (shown in FIGURE 2) the line between the shaft 59 and the lowermost end of gate 60 is perpendicular to the belt 64. This allows the gate to always swing upwardly from the belt as it moves away from the auger, rather than having a downward portion of its arc at the start of its swing which would cause a decrease in the depth of the grain being fed onto belt 64.

The operation of the plate 76 prevents any sticks or other narrow objects from passing immediately through the belt 64 as they would, for example, if they were fed by the auger end first. The action of the gate 60 will force the foreign objects to lie down as the belt moves them out from the feeding area defined by the wall 56 and gate 58.

As the belt moves the mixture of grain and foreign matter off the plate 76, the small objects such as grain begin to fall through the openings 92 in the belt 64. The bumping, boucing and vibrating action of the rollers 82, coacting with the joints and the openings in the chain mesh cause the mixture on the belt to be bounced around and redistributed, thereby lessening the chance that grain could become entangled or entrapped in foreign matter which would prevent it from passing through the openings 92. This bouncing action causes most of the grain to come into contact with the upper surface of the belt 64, thus presenting an opportunity for it to pass therethrough.

When the matter carried by the belt eventually passes over the roller 94 it enters the downwardly inclined portion of the travel path of the belt 64. This somewhat abrupt change in angle of inclination and the subsequent downward motion of the belt, causes objects such as rocks and sticks to turn over or to roll. Such motion results in the spilling of any grain that had become trapped on top of these objects.

As one can see from the foregoing description, the normal action of the chain mesh belt 64 will bring about a separation of the grain from foreign matter too large to pass through the openings 92. The bouncing and shaking motions brought about by the action of the rollers 82 and the turning or rolling of larger foreign objects which would not be too greatly affected by the bouncing, prevent the grain from becoming entrapped with the foreign matter, whereby it is not given the opportunity to pass through the openings in the belt.

The grain and other objects passing through the openings in the belt 64 will fall downwardly and pass through the lower half of the endless belt 64 which is moving from the shaft 42 to the shaft 68. Of course, some grain, straw and other foreign matter will be, at least temporarily, supported on the lower half of belt 64. This is especially true of the larger foreign matter which may happen to fall through the top half of the belt 64 since the smaller grain will pass through more easily to the belt 100. This foreign matter will be carried toward the shaft 68 and idler pulleys 67 and be compressed between the belt and the pulleys. This will normally result in a buildup of material on the outer surface of the pulleys 67, which, if allowed to continue, will increase the effective diameter of the idler pulleys and stretch the belt 64 too tight for proper operation. The quite narrow pulleys utilized in the disclosed, however, practically eliminate such buildup. Due to their narrow width they will cut straw and other foreign material, whereby it will fall through the belt rather than be compressed onto the outer surface of the pulleys. This same arrangement is utilized on the idler shaft 102 with the belt 100.

Grain and material passing through the lower half of belt 64 fall upon the upper level of the endless belt 100 where additional separation takes place. The action on this belt is the same as that on belt 64, the shaking being induced by the shaft 104 and rollers 106 and the turning and rolling of the larger objects results on the incline following the shaft 108. For better separation, this belt may be composed of a finer mesh than the belt 64. For example, the openings in belt 64 could be one inch square, while the openings in belt 100 could be one-half inch square.

Large objects which do not pass through the belts 64 and 100 are discharged as the belts pass around the shafts 42 and 40 respectively, and fall into the hopper 120. This foreign matter may then be removed from the hopper by any suitable means.

Grain falling through the openings in the belts will fall into the hopper 110. Air that is sucked through the air space above the hopper 110 and through opening 116 by the air suction fan 52 passes through the falling grain and carries with it lighter foreign matter such as dust and chaff. This lighter foreign matter is carried into the hopper 120. Alternatively, the dust may be carried through the fan for disposal in this manner. The grain collected in the hopper 110 moves by force or gravity out of the opening 116 and onto conveyor means (not shown) to be carried to storage or through further processing steps.

As one can see from the foregoing, the objects set forth at the outset are achieved by the present invention. An inexpensive apparatus has been devised which operates in an efficient and simple manner to effectively separate the grain from foreign matter that is gathered as the grain is harvested. The endless belts composed of chain mesh having links therein coact in a normal manner with the small diameter rollers to shake and vibrate the belt and the matter carried thereon to provide for a more thorough separation. Means have been devised to prevent narrow objects from inadvertently passing through the belt and the path of travel of the belt includes an incline to allow large objects to roll thereby spilling any grain that may be on them. Air is circulated through the grain after it has been separated from the larger foreign objects to carry out light particles such as dust. Means have also been provided to dispose of the separated grain and foreign matter.

What is claimed is:

1. Apparatus for removing foreign matter from grain, including:
    a first continuously moving endless belt having a top and bottom run, and including
    a plurality of openings of a predetermined width, said openings being spaced from each other by joints, extending generally transversely of the path of travel of said first belt, and said openings being of a size somewhat larger than said grain,
    first and second portions on said top run inclined in opposite directions, whereby large objects, such as stones, sticks and clods of dirt, will roll when they move from the first to the second section, thereby spilling any grain resting on said large objects,
    means to feed a mixture of grain and foreign matter onto the first belt,
    disc-shaped rollers partially supporting said top run and positioned to be received by at least some of said openings, the width of the rollers being less than said predetermined width of the openings into which the rollers are to be received, whereby the top run will be vibrated by the top run alternatively riding up as the joints pass over the rollers, and down as the rollers are partially received into said openings, and
    first receiving means located below said first belt and extending substantially the entire length of said first and second portions for receiving the grain falling through said openings.

2. The invention of claim 1 and including,
    means for creating a current of air across said first receiving means to separate and carry away light foreign matter from the grain as it falls into said receiving means.

3. The invention of claim 2 wherein,
    said first endless belt passes about gears mounted on shafts positioned at opposite ends of said top and bottom run, the belt contacting only the gears which are further defined as being relatively thin, whereby foreign matter is broken up or cut upon contact therewith, thereby having less of a tendency to stick and build up on said gears.

4. The invention of claim 3 and including,
    a second endless belt having top and bottom runs positioned between the first belt and the first receiving means, said second endless belt having openings to allow grain to pass therethrough, and
    rollers partially supporting said top run of the second belt and positioned to be received by at least some of said openings therein, a portion of said rollers being smaller than said openings whereby the top run of the second belt will be vibrated by the alternate movement of the rollers into and out of said openings.

5. The invention of claim 4 wherein,
    both of said belts have discharge ends to discharge the large objects that do not fall through said openings, and
    second receiving means positioned below the discharge ends to receive said large objects.

6. The invention of claim 5 wherein said means for creating the current of air is further defined as including,
    an air opening near one end of the receiving means, and
    air flow creating blower means positioned near the opposite end of the first receiving means for drawing air from said air opening.

7. The invention of claim 6 and including a plate having a substantially flat upper surface over which the top run of the first belt passes, said surface being positioned opposite the feed means.

8. The invention of claim 1 and including,
    a second endless belt having top and bottom runs and positioned between the bottom run of the first belt and the top of the first receiving means,
    openings in said second belt to allow grain to pass therethrough,
    first and second portions in said second belt which are inclined in opposite directions and extend generally parallel to the first and second portions of said first endless belt,
    rollers partially supporting said top run of said second belt and positioned to be received by at least some of said openings, and having a portion of the rollers smaller than said openings in the second belt, whereby the top run will be vibrated by the alternate movement of the rollers into and out of said openings,
    both of said first and second belts being comprised of chain mesh having links therein, said links having said openings therein,
    both of said belts having discharge ends for discharging large objects that do not fall through said openings,
    second receiving means located below said discharge ends of said first and second belt for receiving said large objects,
    a first air opening near one end of the first receiving means,
    a second air opening in the bottom of said first receiving means through which the separated grain moves by gravity,
    air current creating means positioned near the opposite end of the first receiving means for drawing air through said first and second air openings to carry any light foreign matter from the grain as it falls into said first receiving means.

References Cited

UNITED STATES PATENTS

| | | | |
|---|---|---|---|
| 710,981 | 10/1902 | Jessup | 209—308 |
| 878,285 | 2/1908 | Heimburger | 209—308 X |
| 1,695,371 | 12/1928 | Felde | 209—307 X |
| 2,085,283 | 6/1937 | Webb | 209—307 X |
| 2,609,925 | 9/1952 | Weisz | 209—307 X |
| 3,070,944 | 1/1963 | Peto | 209—308 X |
| 3,241,670 | 3/1966 | Snell | 209—307 X |
| 3,372,806 | 3/1968 | Porter | 209—308 X |

HARRY B. THORNTON, Primary Examiner

ROBERT HALPER, Assistant Examiner

U.S. Cl. X.R.

209—32, 240, 265, 308, 382